No. 788,470. PATENTED APR. 25, 1905.
E. JEHN.
CHANGING MECHANISM FOR PICTURE EXHIBITORS.
APPLICATION FILED JUNE 16, 1903.

3 SHEETS—SHEET 1.

Witnesses

Inventor
Edouard Jehn,
By Wm E Poulter
Attorney

No. 788,470. PATENTED APR. 25, 1905.
E. JEHN.
CHANGING MECHANISM FOR PICTURE EXHIBITORS.
APPLICATION FILED JUNE 16, 1903.
3 SHEETS—SHEET 2.
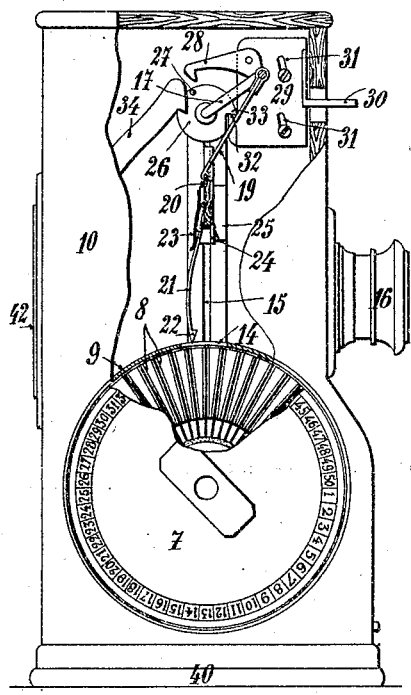
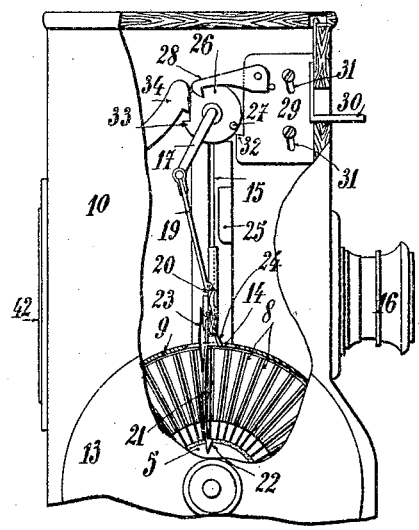

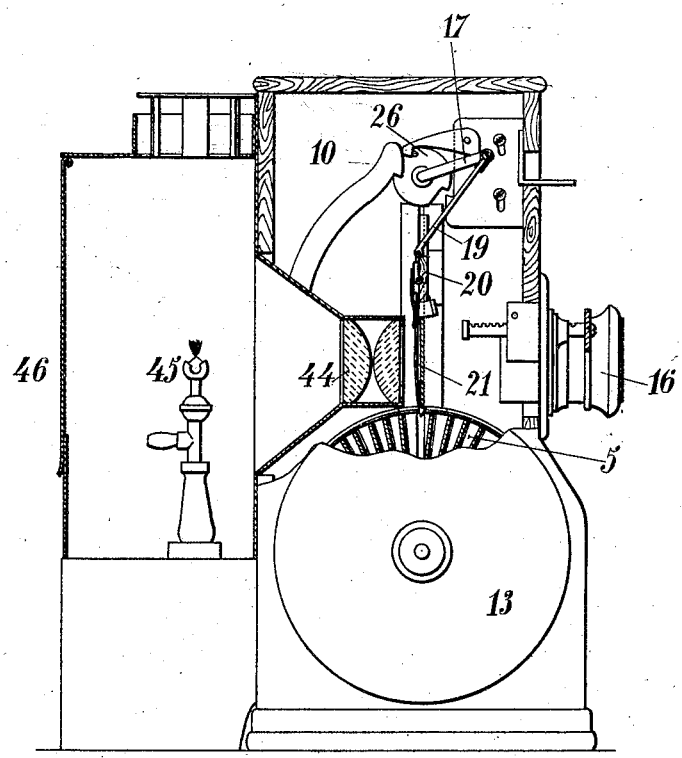

No. 788,470.                                   Patented April 25, 1905.

UNITED STATES PATENT OFFICE.

EDOUARD JEHN, OF PARIS, FRANCE.

CHANGING MECHANISM FOR PICTURE-EXHIBITORS.

SPECIFICATION forming part of Letters Patent No. 788,470, dated April 25, 1905.

Application filed June 16, 1903. Serial No. 161,719.

*To all whom it may concern:*

Be it known that I, EDOUARD JEHN, a citizen of the Republic of France, residing at Paris, France, have invented certain new and useful Improvements in Changing Mechanism for Picture-Exhibitors, of which the following is a specification.

This invention relates to an apparatus for automatically and continuously moving photographic or other views in front of an object-glass or before the eyes of a spectator.

The characteristic features of this invention are as follows:

First. The views are successively brought as near as it is desired either to the eye or to the eyepiece or to a condenser of a lantern or projecting apparatus or to the two latter at once. The result is that the view can be considerably enlarged by means of an object-glass of short focal length, whether it be looked at directly or projected on a screen.

Second. An endless movement—that is to say, when all the views have successively passed the first view appears again, and so on.

Third. The movement is automatic—that is to say, as long as the motor is working the same operations are reproduced indefinitely.

An apparatus according to this invention is shown, by way of example, in the accompanying drawings, in which—

Figure 1:
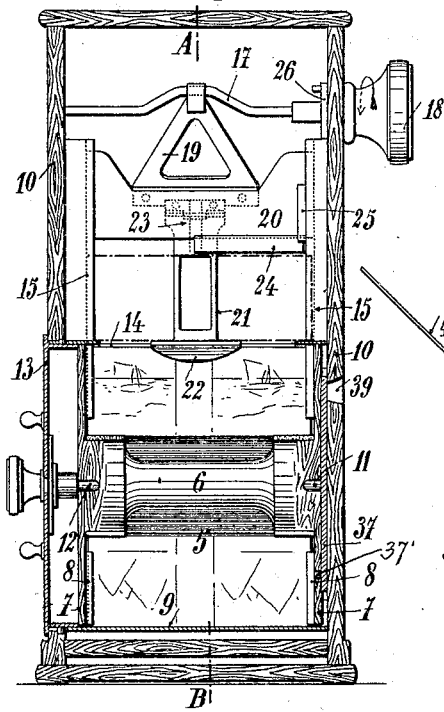
Figure 2:
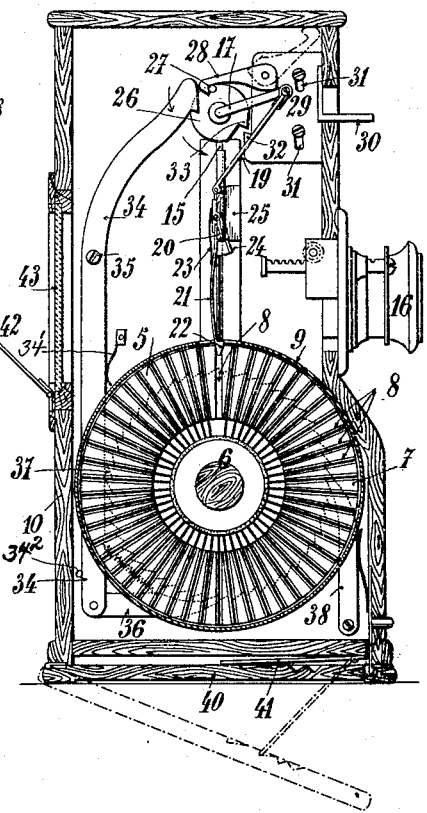

Figure 1 is an elevation of a stereoscopic apparatus according to this invention with the front wall removed, so as to show the inner parts. Fig. 2 is a vertical section on the line A B of Fig. 1 with one of the views shown in position in front of the eyepieces. Fig. 3 is a side elevation, portions of the wall of the apparatus being broken away, so as to show the parts at the moment when a view is being returned to its place. Fig. 4 is a view similar to that of Fig. 3, but showing only a portion of the apparatus with the parts in the position occupied at the moment when the next view is about to be drawn up. Fig. 5 is a side elevation, partly in section, showing the apparatus arranged for projecting the views on a screen.

As is well known, the enlargement of a view to be examined or projected is the greater the nearer it can be brought to an optical system of short focus. In order to fulfil these conditions, it is therefore necessary that the apparatus for moving the views should be designed so as not to interfere with the fulfilment of this condition.

The apparatus for moving the views according to this invention enables each view after examination to pass to the bottom of the apparatus, so as to leave a free space in front and at the back of the plate, and a new slide or view to be brought up, and, finally, insures the continuity of the movement of the views. For this purpose the "slides" in the apparatus according to this invention are placed in a drum 5, consisting of a core or shaft 6 and outside disks 7, provided on their inner sides with radial grooves 8 or partitions, so that the slides can be placed in these grooves somewhat like the paddles of a paddle-wheel. The drum 5, provided with all its slides, is placed in a cylinder 9, arranged horizontally at the bottom of the casing 10 of the apparatus and mounted on axial pins 11 and 12, one pin, 11, being secured to the wall of the apparatus and the other pin, 12, being carried by a cover-plate 13, which is placed on the cylinder 9 after the drum 5 has been introduced and is secured thereto by pins projecting from the periphery of said cover engaging bayonet-slots in the cylinder. The cylinder 9 is provided at the top with a transverse slot 14, so as to enable the slide coming opposite it to be withdrawn. Adjoining the ends of the slot 14 (which is larger in the center for the purpose of allowing a hooked frame to pass, as hereinafter explained) are arranged on the walls of the apparatus grooves 15, forming continuations of the grooves 8 in the drum 5. The slide that is to be brought into the focus of the eyepieces 16 of the apparatus is guided by means of these grooves 15. Above the grooves or recesses 15 is arranged a cranked shaft 17, which can be turned directly from the outside of the apparatus by means of a knob 18 or by means of any suitable mechanism for the purpose of imparting to the shaft 17 an intermittent movement in the same direction. To the crank of this shaft 17 is connected the head of a kind of connecting-rod 19, the lower part of which is connected to a cross-bar 20, sliding with its ends in the side grooves 15. To the cross-bar 20 is pivoted a flexible frame 21, the lower side of which is constituted by a hook 22 and against the upper side of which rests a spring 23. Opposite the spring 23 the frame 21 is provided with an angle-piece 24, one of the arms of which forms an inclined plane relatively to the cross-bar 20 and coöperates with a fixed tappet 25 to force the hook 22 back when said cross-bar 20 arrives at a certain height.

It will be seen that when the knob 18 is turned in the direction of the arrow the crank-shaft 17, by means of its connecting-rod 19, will cause the cross-bar 20, and consequently the frame 21, to rise to its topmost position. The continued rotation of the knob 18 in the same direction will then cause the frame 21 to descend vertically.

It must be pointed out that when the cross-bar 20 arrives at the top of its upward stroke the hook 22 is thrown back by the inclined plane of the angle-piece 24, which is acted upon by the fixed tappet or projection 25, as shown in Fig. 3, so that when the cross-bar 20 descends again the hook 22, held in that position during a certain portion of its course, enters the space comprised between two of the slides in the drum 5. Immediately after engaging between these two slides the hook 22 is released from the backward pressure, and forced by its spring 23 presses against the back of the slide and toward the end of the downward stroke of the cross-bar 20 passes under it in order to raise it and to cause it to slide in the grooves 15 to the height of the eyepieces during the return or upward movement of the said cross-bar 20.

In a stereoscopic apparatus, shown by way of example, the device for stopping the slides at the focus of the eyepieces consists of a catch-disk 26, secured to the shaft 17 and provided with a lateral pin 27, coöperating with a hook 28, pivoted to a vertically-movable plate 29. When the slide removed from the compartmental drum 5 has arrived at the required height, the pin 27 engages the lip of the hook 28 and the shaft 17 is stopped until the hook 28 is raised, which is effected by means of a finger 30, with which the plate 29 is provided and which passes through the wall of the apparatus to the outside. When the plate 29 is raised, it moves at an angle, owing to slots and guides 31, provided for the purpose, so that a projection 32 on said plate engages a projection 33 on the disk 26, so as to cause the shaft 17 to turn slightly. In this movement the angle-piece 24 strikes the tappet 25 and the hook 22 is withdrawn from under the slide, which, being no longer held, falls back into its place in the drum 5. As soon as the movable plate 29 is released it falls back and its hook 28 comes to lie behind the pin 27, which had been displaced during the slight rotary movement previously communicated to the shaft 17. By continuing to rotate the knob 18 the pin 27 comes against the head of a lever 34, pivoted at 35 to the wall of the apparatus, and communicates to it a certain movement, which is transmitted, by means of a spring-pawl 26, provided at its other end, to a ratchet 37, provided on its inner face with a pin 37', which engages a recess in the corresponding disk or end 7 of the drum 5 when the latter is put in place. The stroke of this lever is limited by a stop $34^2$, against which it is normally held by a spring 34', so that at each operation the drum is caused to turn through one division and bring the next slide exactly opposite the bottom of the grooves 15, in which this slide, removed in its turn, will be guided. Another pawl, 38, holds the drum in position during the return stroke of the lever 34 and pawl 36.

Numbered divisions engraved on the ratchet-wheel 37 opposite each of the slides successively pass in front of a window 39, made in the wall of the apparatus, and enable the numbers of the slides examined to be noted and identified. Corresponding numbered divisions are also marked adjacent to the edge of the front disk 7 of the drum 5, as shown in Fig. 3. These numbers on the front disk are necessary in order to identify the radial slots when the drum 5 is removed for the purpose of changing the views, as in the latter case the counting-disk 37 remains on its axis 11 in the apparatus and is therefore not available for identification purposes.

The slide-frame 21 is perforated to enable the inscription that can be engraved or written on the space separating two images of a stereoscopic print to be read.

The bottom of the apparatus is provided with a pivoted rack-plate 40, so that by means of a hinged flap 41 the apparatus can be arranged in an inclined position.

A hinged mirror or reflector 42, arranged in front of a ground-glass screen 43, placed in the wall of the apparatus immediately behind the frame, can be placed at an inclined position, so as to reflect the rays of light at the correct right angle.

It is obvious that besides the example illustrated and described in the foregoing this invention may be utilized for projecting the views on a screen, as shown in Fig. 5, the apparatus being operated either by hand or mechanically. In the latter case the mirror 42 and the opaque glass 43 are removed, and instead of them in the window of the apparatus is placed a condenser 44, by which the rays of a lamp 45 of any desired construction are concentrated, said lamp being inclosed in a lantern 46, arranged behind the said apparatus.

What I claim as my invention, and desire to secure by Letters Patent, is—

1. Apparatus for use in viewing or projecting photographic or other views comprising a transversely-slotted casing, a rotatable drum therein, provided with a plurality of radial slide-receiving grooves, means for imparting to the drum an intermittent rotary motion, a slide engaging hook, means for alternately raising and lowering said hook, and a device for releasing the raised slide from said hook substantially as described.

2. Apparatus for use in viewing or projecting photographic or other views comprising a transversely-slotted casing, a rotatable drum therein provided with a plurality of radial slide-receiving grooves, a slide-engaging hook, vertical guides therefor, a crank-shaft connected to the hook, a catch-disk mounted on the crank-shaft and means for securing and releasing said catch-disk: substantially as described.

3. Apparatus for use in viewing or projecting photographic or other views, comprising a transversely-slotted casing, a rotatable drum therein provided with a plurality of radial slide-receiving grooves, a slide-engaging hook, vertical guides therefor, a crank-shaft connected to the hook, a catch-disk mounted on the crank-shaft, means for securing and releasing said catch-disk, in combination with a pivoted lever 34, a pawl 36, and a ratchet-wheel 37 mounted on the drum: substantially as described.

In testimony whereof I have signed my name to this specification in the presence of two subscribing witnesses.

EDOUARD JEHN. [L. S.]

Witnesses:
 LOUIS SULLIGER,
 J. ALLISON BOWEN.